Patented Nov. 1, 1932

1,885,870

UNITED STATES PATENT OFFICE

CHESTER SNYDER, OF YONKERS, NEW YORK

PROCESS OF FLAME-PROOFING AND PRODUCT FORMED THEREBY

No Drawing.   Application filed August 9, 1930.  Serial No. 474,313.

A great variety of substances have been used to impart non-flaming or "flame-proof" properties to materials like fabrics and wood. The material to be flame-proofed is, as a rule, impregnated with the flame-suppressing agent. The latter may accomplish its object by liberating a flame-extinguishing gas, such as ammonia or water vapor, when it is heated. In other cases the flame-proofing substance appears to melt on the fabric when heated, thus excluding oxygen and preventing the propagation of the flame. In still other cases, the flame-proofing material seems to act like the mordants used in dyeing, attaching itself to the material impregnated, and perhaps to some extent chemically combining with it. Flame-proofing agents of the latter class are used in the so-called Perkins process in which the fabric or the like is first immersed in a solution of sodium stannate, and then in a solution of ammonium salt, such as the sulphate. The effect is to precipitate tin oxide on the fibre.

Deposited in this way, the tin oxide is intimately associated with the fibre and is not readily removed as compared with many other flame-proofing substances. Nevertheless, continued exposure to moisture, and particularly weathering, cause a gradual loss of the flame-proofing properties.

A principal object of my invention is to provide a supplemental treatment to fix or anchor flame-proofing agents on materials to which they have been applied, and thus to lessen their tendency to be dislodged by usage, vibration or by water.

A further object is to provide by such supplemental treatment a coating or impregnation which will prevent the afterglow which often occurs when flame-proofed materials have been brought to a temperature high enough to produce destructive distillation.

Since such supplemental treatment protects the primary flame-proofing agent against water, the supplemental agent must itself be insoluble in water; and by its application the material treated is therefore rendered more or less water-proof as well as fire-proof.

The substance used for fixing the flame-proofing agent on a fabric or the like, in accordance with my invention, comprises a flame-proof vinyl resin, that is, a resinous product resulting from the polymerization of certain vinyl compounds, especially a chlorine-containing resin such as can be made by polymerizing vinyl chloride. I prefer to impregnate the fabric or the like with the primary flame-proofing agent, then dry, and then impregnate with a dilute solution of the vinyl resin. It is possible however, to apply the unpolymerized vinyl compound, such as vinyl chloride to the fabric, and then to polymerize it in situ by any suitable means.

The resin which, according to my experience, serves best is made by conjointly polymerizing (by which is meant the polymerizing of a plurality of compounds which are in mutual contact) vinyl chloride with another vinyl compound, such as the acetate. The two esters may be dissolved together in a solvent such as toluene, and then polymerized by any known or suitable method, such as heating, or the action of ultra violet radiation, or by the action of a substance like benzoyl peroxide. Excellent results have been obtained by polymerizing a mixture containing 80 parts of vinyl chloride with 20 parts of vinyl acetate, diluting the resulting resin solution with toluene, and then applying it to the fabric or the like.

As appears from the foregoing description, my process comprises applying one or more of the flame-proofing substances of the prior art, and then applying a vinyl resin to prevent dislodgment of the agent first applied, thus enhancing and preserving the flame-proofing qualities and suppressing after-glow effects. As the primary flame-proofing substance, I prefer tin oxide deposited in the manner described above, or in any other suitable way, but I may replace the stannate with a soluble titanate or tungstate. Such salts, under suitable conditions, will precipitate the corresponding heavy metal oxides on the fibre, and impart flame-proofing properties similar to those produced by tin oxide.

In a specific example, eight ounce cotton duck was thoroughly impregnated with an aqueous solution of sodium stannate of specific gravity 1.21, containing approximately 3 pounds of stannate per gallon of solution. This step was carried out in a tank having squeeze rolls below the liquid level. The duck was passed through the liquid and between the rolls, so that the alternate compressions and expansions insured thorough impregnation. The excess solution was then removed. The amount of solution remaining in the cloth after this step was approximately 65% of the initial weight of the cloth. The duck was then dried, and thereafter it was passed through a solution of ammonium sulphate of specific gravity 1.07. The ammonium sulphate reacts immediately with the stannate, depositing stannic oxide in and on the fibres. The material was then passed through squeeze rolls to remove the excess ammonium sulphate solution, after which it was thoroughly washed in water to remove soluble chemicals. The fabric was then dried and thereafter passed through the resin solution. This solution contained 3% of vinyl resin, 1% of tricresyl phosphate, and 1% of the fatty acids of tung oil, all dissolved in toluene. The resin was made by polymerizing a mixture containing four parts of vinyl chloride and one part of vinyl acetate while the esters were dissolved together in toluene. After removing it from the resin bath the fabric was squeezed to remove excess resin solution, and was finally heated for the removal of the toluene. The tricresyl phosphate is itself a known flame-proofing agent, and the phosphate and fatty acids serve to render the resin film more flexible and durable. Such substances are in general use in the manufacture of plastics, and each can be replaced by its known equivalents. Thus, instead of tricresyl phosphate I may use dibutyl phthalate; and instead of the acids of tung oil I may substitute other non-hygroscopic fatty acids, such as those prepared from perilla oil. It is to be understood, however, that such modifying and plasticizing agents are not essential constituents, and under many conditions they may be omitted.

The invention may be applied to cotton, wool, kapok, linen, jute, and other fibres, and also to wood and leather. Woven materials treated by my process may be used for tents, awnings, bunting, draperies, stage settings, covers for heat-insulated pipes, and many other purposes. A particularly important use of the invention is in the flame-proofing of the perforated screens used for sound pictures. Screens treated by my process are permanently flame-proof, and have a surface which reflects light well and is easy to clean.

I claim:

1. Process which comprises impregnating an inflammable fibrous material with a flame-proofing agent, and coating the impregnated material with a chlorine-containing vinyl resin; whereby said flame-proofing agent is protected from water and from dislodgment, and the tendency to after-glow is diminished.

2. Process which comprises impregnating an inflammable fibrous material with a heavy metal oxide, and coating the impregnated material with a chlorine-containing vinyl resin; whereby said flame-proofing agent is protected from water and from dislodgment, and the tendency to after-glow is diminished.

3. Process which comprises impregnating an inflammable fibrous material with tin oxide, and coating the impregnated material with a chlorine-containing vinyl resin; whereby said flame-proofing agent is protected from water and from dislodgment and the tendency to after-glow is diminished.

4. Process which comprises impregnating an inflammable fibrous material with a heavy metal oxide, and coating the impregnated material with polymerized vinyl chloride; whereby said flame-proofing agent is protected from water and from dislodgment, and the tendency to after-flow is diminished.

5. Process which comprises impregnating an inflammable fibrous material with a heavy metal oxide, and coating the impregnated material with a resin comprising the product of the conjoint polymerization of vinyl chloride and vinyl acetate; whereby said flame-proofing agent is protected from water and from dislodgment, and the tendency to after-glow is diminished.

6. Process which comprises impregnating an inflammable fibrous material with tin oxide, treating the impregnated material with a solution comprising a chlorine-containing vinyl resin, a plasticizer, and a solvent, and then evaporating said solvent; whereby said flame-proofing agent is protected from water and from dislodgment, and the tendency to after-glow is diminished.

7. A flame-proofed fibrous material having a primary flame-suppressing agent associated with its fibers, and fixed thereon by a protective substance comprising a non-inflammable vinyl resin.

8. A flame-proofed fibrous material having a heavy metal oxide associated with its fibers, and fixed thereon by a protective substance comprising a non-inflammable chlorine-containing vinyl resin.

9. A flame-proofed fabric having tin oxide associated with its fibers and fixed thereon by a protective substance comprising a polymerized vinyl chloride.

10. A flame-proof screen on which to project pictures, said screen comprising fabric impregnated with a heavy metal oxide and coated with a chlorine-containing vinyl resin.

In testimony whereof, I affix my signature.

CHESTER SNYDER.